United States Patent Office 3,335,190
Patented Aug. 8, 1967

3,335,190
PRODUCTION OF 4-ALKYLMERCAPTOPHENOLS
Robert J. Du Bois, Morristown, N.J., and Basil S. Farah, Allentown, Pa., assignors to Allied Chemical Corporation, New York, N.Y., a corporation of New York
No Drawing. Filed Nov. 5, 1964, Ser. No. 409,289
5 Claims. (Cl. 260—609)

This invention relates to an improved process for the production of 4-alkylmercaptophenols, and particularly 4-methylmercaptophenol.

Many phosphates and thiophosphates derived from 4-alkylmercaptophenols are potent insecticides. For example, the outstanding insecticidal activity of O,O-dimethyl-O-(4-methylmercaptophenyl) phosphate derived from 4-methylmercaptophenol is described in U.S.P. 3,151,022 of Everett E. Gilbert and Julian A. Otto, which issued on Sept. 29, 1964.

It is important in the commercialization of such phosphates and thiophosphates to provide economical and efficient processes for preparing the 4-alkylmercaptophenols. U.S.P. 2,995,608 of Detlef Delfs and Karlfried Wedemeyer, issued Aug. 8, 1961, describes the preparation of 4-alkylmercaptophenols by the action of sulfuryl chloride on a mixture of a dialkyl disulfide and phenol, preferably in the presence of a catalytic amount of a condensation agent such as hydrochloric acid, benzene sulfonic acid, zinc chloride and boron trifluoride. This process, however, suffers from the disadvantage of requiring use of relatively expensive sulfuryl chloride.

The principal object of the present invention is to provide an improved process for the production of 4-alkylmercaptophenols, and particularly 4-methylmercaptophenol. Other objects and advantages of the invention will appear hereinafter.

In accordance with the present invention, it has been found that a 4-alkylmercaptophenol may be readily produced by contacting a mixture of a dialkyl disulfide and boron trifluoride phenolate with chlorine at reaction temperature of not more than about −10° C., hydrolyzing the resultant reaction mixture and recovering the 4-alkylmercaptophenol from the hydrolyzed mixture.

The dialkyl disulfide employed in the process of the invention preferably contains alkyl groups having 1 to 5 carbon atoms. These dialkyl disulfides include dimethyl disulfide, diethyl disulfide, di-n-butyl disulfide, di-i-butyl disulfide, di-n-amyl disulfide, di-i-amyl disulfide and di-(chloromethyl) disulfide. Generally speaking, about 1 to 3 mols of boron trifluoride phenolate per mol of dialkyl disulfide are used, the preferred ratio being about 2:1.

Boron trifluoride phenolate ($BF_3 \cdot 2C_6H_5OH$) is a commercial product and may be used as such. Alternatively, the compound may be formed in situ by separately introducing boron trifluoride and phenol. In the latter case, about 0.5 to 1 mol of boron trifluoride per mol of phenol is employed. Higher proportions of boron trifluoride may be used but are not desirable since excess boron trifluoride must be removed from the reaction mixture. If the process of this invention is carried out in the absence of boron trifluoride or with catalytic amounts of boron trifluoride, far inferior yields of 4-alkylmercaptophenols are obtained.

The chlorine is utilized in anhydrous form, preferably as dry chlorine gas. The chlorine may be employed in substantially equimolar amount with respect to the dialkyl disulfide; however, it is preferred to employ up to about 10% in excess of that amount.

The chlorine addition is carried out with agitation, while maintaining reaction temperature of not more than about −10° C. Preferably, the reaction temperature is within the range of about −10° C. to about −20° C. If liquid chlorine is employed, reaction temperature of below about −30° C. should be utilized. It has been found that if reaction temperature above about −10° C. is employed, the yields of 4-alkylmercaptophenols drop off sharply. Moreover, if boron trifluoride is not used or if only catalytic amounts of boron trifluoride are used, little or no yields of 4-alkylmercaptophenols are obtained at reaction temperature above about −10° C.

After the chlorination reaction is complete, the reaction mixture is hydrolyzed with water, while agitating, to form the desired 4-alkylmercaptophenol. The amount of water employed is generally about 1 to 20 mols per mol of boron trifluoride phenolate charged, preferably about 8 to 12 mols per mol of the charged phenolate.

As indicated above, the high yields of 4-alkylmercaptophenols achieved by the process of this invention are due to the combined use of boron trifluoride phenolate (or its equivalent) and reaction temperature of not more than about −10° C.

Although it is not intended to be bound by any theory, it is hypothesized that the outstanding results of the present invention are attained by formation of a boron trifluoride complex with the end product of the reaction, protecting it from attack by chlorine which might otherwise split off the alkylthio group to form alkyl sulfenyl chloride, as well as effect nuclear chlorination of the phenol to form chlorinated phenol. It is believed that the participation of boron trifluoride in the reaction, with specific reference to the formation of 4-methylmercaptophenol, may be depicted by the following equations:

(1) $2(BF_3 \cdot 2C_6H_5OH) + CH_3SSCH_3 + Cl_2 \rightarrow$
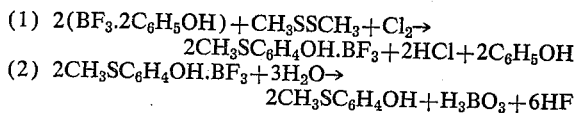
$2CH_3SC_6H_4OH \cdot BF_3 + 2HCl + 2C_6H_5OH$ (2) $2CH_3SC_6H_4OH \cdot BF_3 + 3H_2O \rightarrow$
$2CH_3SC_6H_4OH + H_3BO_3 + 6HF$ In typical operation, the dialkyl disulfide is admixed with boron trifluoride phenolate, and chlorine is added to the mixture, while maintaining reaction temperature between about −10° C. and about −20° C. The resultant mixture containing intermediate compound is allowed to warm to about room temperature and hydrolyzed with water. The mixture is then diluted with an inert organic solvent for the 4-alkylmercaptophenol. Suitable inert organic solvents include halogenated organic compounds such as methylene chloride, chloroform, carbon tetrachloride, perchloroethylene and dichlorodifluoroethane, ether, etc. Use of a chlorinated organic compound as solvent is preferred. Addition of the solvent results in the formation of aqueous and organic layers. The aqueous and organic layers are readily separated, as by decantation. The organic layer is then vacuum distilled to recover the 4-alkylmercaptophenol product as residue.

If desired, the inert organic solvent can be added with the initial reactants, in which case the aqueous and organic layers are obtained directly upon hydrolysis with water.

The present invention is further illustrated by the example set forth below. In the example, parts are by weight.

*Example 1*

85 parts of dry chlorine gas were added over a one hour period to a stirred mixture of 94.2 parts of dimethyl disulfide and 256.2 parts of boron trifluoride phenolate, while maintaining reaction temperature between about −10° C. and −20° C. with external cooling. The resulting reaction mixture containing intermediate compound was allowed to warm to room temperature and then stirred with about 200 parts of water over a ten minute period, maintaining the temperature at about 33° to 38° C. with external cooling. The mixture was then diluted with about 267 parts of methylene chloride to form aqueous and organic layers. The organic layer was separated from the aqueous layer. The organic layer was then washed with water, dried and distilled to give 139.5 parts (50% yield) of 4-methylmercaptophenol product (B.P. about 122° C. at 3 mm. Hg pressure). The infrared curve of the product was identical to that of a known sample of 4-methylmercaptophenol.

While the above describes the preferred embodiment of our invention, it will be understood that departures may be made therefrom within the scope of the specification and claims.

We claim:

1. A process for the production of a 4-alkylmercaptophenol in which the alkyl group contains 1 to 5 carbon atoms which comprises contacting a mixture of a dialkyl disulfide in which the alkyl groups contain 1 to 5 carbon atoms and boron trifluoride phenolate with chlorine, in mol ratio of about 1 to 3 mols of boron trifluoride phenolate per mol of dialkyl disulfide, at reaction temperature of not above about −10° C., hydrolyzing the resultant reaction mixture and recovering the 4-alkylmercaptophenol from the hydrolyzed mixture.

2. The process of claim 1 wherein the chlorination is carried out at reaction temperature of about −10° C. to about −20° C.

3. The process of claim 1 wherein the dialkyl disulfide is dimethyl disulfide.

4. A process for the production of 4-methylmercaptophenol which comprises contacting a mixture of dimethyl disulfide and boron trifluoride phenolate with chlorine, in mol ratio of about 1 to 3 mols of boron trifluoride phenolate per mol of dimethyl disulfide, at reaction temperature of about −10° C. to about −20° C., hydrolyzing the resultant reaction mixture and recovering 4-methylmercaptophenol from the hydrolyzed mixture.

5. The process of claim 4 wherein about 2 mols of boron trifluoride phenolate per mol of dimethyl disulfide are used.

References Cited

Houben-Weyl: Methoden der Organischen Chemie, Vierte Auflage, p. 142.

CHARLES B. PARKER, *Primary Examiner.*

D. R. PHILLIPS, *Assistant Examiner.*